Figure 1:
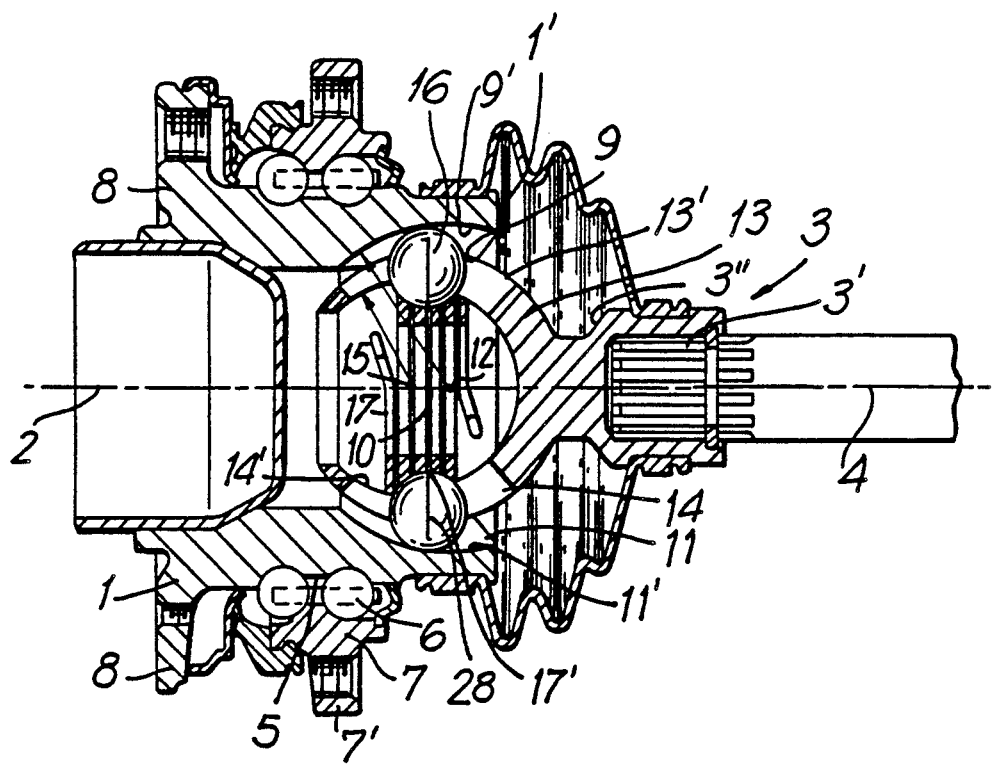

United States Patent [19]

van der Drift et al.

[11] Patent Number: 4,995,850
[45] Date of Patent: Feb. 26, 1991

[54] HOMOKINETIC COUPLING HAVING A GUIDING DEVICE HAVING A RADIAL SPRING FORCE ACTION

[75] Inventors: Ernst van der Drift; Hendrikus J. Kapaan, both of Nieuwegein, Netherlands

[73] Assignee: SKF Industrial Trading and Development Company B.V., Nieuwegein, Netherlands

[21] Appl. No.: 360,760

[22] Filed: May 23, 1989

[30] Foreign Application Priority Data

May 31, 1988 [NL] Netherlands .......................... 8801394

[51] Int. Cl.[5] .............................................. F16D 3/24
[52] U.S. Cl. ..................................... 464/143; 464/906
[58] Field of Search .............. 464/139, 141, 142, 143, 464/152, 906

[56] References Cited

U.S. PATENT DOCUMENTS

| | | | |
|---|---|---|---|
| 1,677,311 | 7/1928 | Weiss | 464/142 |
| 2,238,647 | 4/1941 | Ivandick | 464/906 X |
| 2,286,498 | 6/1942 | Miller, Jr. | 464/142 |
| 2,839,905 | 6/1958 | Trbojevich | 464/142 |
| 3,919,861 | 11/1975 | Bellomo | 464/906 X |
| 4,156,354 | 5/1979 | Krude | 464/141 |
| 4,249,395 | 2/1981 | Krude et al. | 464/143 |
| 4,493,676 | 1/1985 | Krude | 464/141 |

FOREIGN PATENT DOCUMENTS 1141798 1/1969 United Kingdom .

Primary Examiner—Daniel P. Stodola
Attorney, Agent, or Firm—Rosen, Dainow & Jacobs

[57] ABSTRACT

A homokinetic coupling for coupling two components in such a manner as to accomodate swiveling motion therebetween. One component includes a housing and the other component is a shaft with a spherical end portion received in the housing. The end portion includes grooves which open radially inwardly to a central hollow. The housing includes a corresponding number of grooves. Balls are disposed in the corresponding grooves of the end portion and housing. A helical coil tension spring is disposed concentrically within the hollow to provide a radially outward spring force on the balls.

1 Claim, 2 Drawing Sheets

HOMOKINETIC COUPLING HAVING A GUIDING DEVICE HAVING A RADIAL SPRING FORCE ACTION

The invention concerns a homokinetic coupling for coupling two components, in particular a rotating drive shaft and a device to be rotated, in such manner that these components can be swiveled from a position in which their cardioids are located in each other's extension to a position in which the cardioids are at an angle to one another, including an outside coupling part in the shape of a housing which can be connected to one of the components so that the cardioid of the housing coincides with the cardioid of the component, and which on one side has a cavity open to the outside and bounded by part of a spherical surface, whereby the center of the sphere coincides with the point at which the aforementioned cardioids intersect, and an inside coupling part including a generally spherical device can be connected to the other component so that their cardioids coincide, whereby in the wall of the cavity of the outside coupling part a number of grooves have been cut in the direction of the cardioid of the housing whose bottoms each follow the course of the arc of a circle, whereby the common center of the arcs is located on the extension of the cardioid of the housing at a distance from the aforementioned center of the spherical surface, and that inside the spherical device of the inside coupling part an equal numbr of grooves have been cut in the direction of the cardioid of that coupling part, whose lower boundaries follow the course of arcs of circles whose common center is located on the extension of the cardioid of the inside coupling part at a distance from the center of the spherical surface, and that an equal number of torque-transferring elements are present, in particular balls, which are each contained partially in a groove in the wall of the cavity and partially in a corresponding groove in the spherical device, which elements interact with a guiding device in such manner that the centers of the elements are located in a plane which is perpendicular to the plane of the cardioids. A similar homokinetic coupling is known from the British patent No. 1141798.

In the known coupling the guiding device consists of a cage with openings, each of which enclosed a torque-transferring element, in particular a ball, which is located between the wall bounding the cavity in the housing and the spherical device, whereby the grooves in the spherical device are closed at their lower ends. This coupling has the disadvantage that after a relatively short period of use a certain amount of play develops between the outside and the inside coupling parts and the torque-transferring elements, which may lead to a relatively short life-span of the coupling, in addition to a distrubing rattling sound.

The objective of the invention is to create a coupling of the type mentioned which does not have this disadvantage.

This objective is achieved by the fact that in the coupling according to the invention the lower ends of the grooves in the spherical device are open so that the torque-transferring elements it contains project inward, and the guiding device consists of a generally disk-shaped device mounted inside the spherical device, which has a groove along its circumference containing the inwardly projecting parts of the torque-transferring elements, whereby the disk-shaped device is furthermore designed in such a manner that it exercises on the aforementioned elements a spring force directed radially outward. The device of course is also a steering means for the balls. In a coupling executed in this manner the torque-transferring elements, in particular the balls, are constantly pre-tensed in an outward direction, which means that any play due to wear and tear is eliminated immediately and permanently.

In an advantageous embodiment the disk-shaped guiding device will consist of a strip wound into a tension spring made of spring steel or a similar material.

The disk-shaped guiding device may also consist of two disks running parallel to one another at a distance and connected to each other at their centers, whose circumferences have been bent into lips which, together, form a groove.

In yet another form of execution the disk-shaped guiding device consists of two sliding disks mounted on a shaft section which are driven toward one another by means of a spring device, and both of which have a recess along their circumferential edges so that both recesses, together, form a groove.

Figure 2:
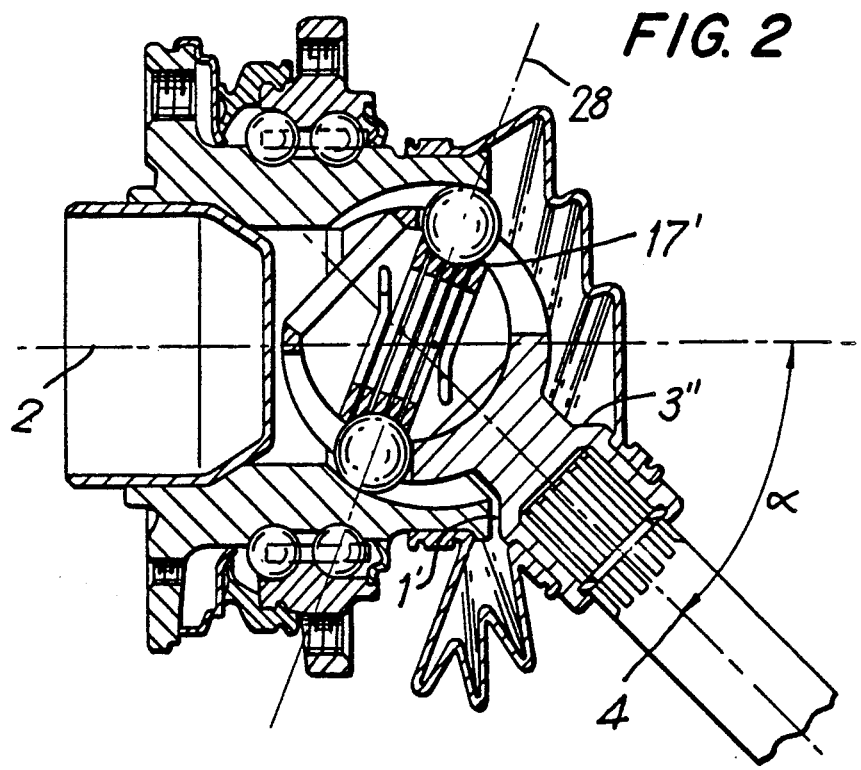
Figure 3:
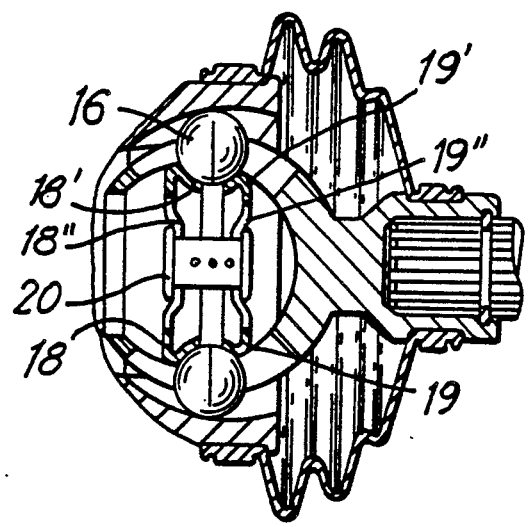

The invention is described further with reference to the drawing in which;

FIG. 1 presents a longitudinal section of a form of execution of the coupling according to the invention, FIG. 2 presents the same coupling rotated over a certain angle and, FIG. 3, together with 3a, 4, 4a and 5, presents other forms of execution of the disk-shaped guiding device.

As shown in FIG. 1, the coupling includes an outside part in the shape of a housing 1 with a cardioid 2 and an inside part 3 with a cardioid 4. A circumferential part 5 of the housing 1 forms the inner race for a roller bearing with rollers 6 and an outer race 7 equipped with a flange 7' by means of which the coupling can be connected, for example, to the chassis of a motor vehicle with front-wheel drive. The housing 1 is further equipped with a hub 8 by means of which the hub of a wheel can be attached to the housing. The housing 1 has an open cavity which is bounded by part of a spherical surface 9 having a spherical portion 9' whose center is located at 10. The wall of the cavity contains a number of grooves 11, for example six, whose bottoms 11' follow the course of arcs of circles which have a common center 12.

The inside part 3 contains a hollow spherical device or end portion 13 whose outside surface 13' has the shape of a spherical surface with 10 as its center. The spherical device 13 contains an equal number, for example also six, grooves 14 whose open lower ends 14' follow the course of arcs of circles with a common center 15. In addition, part 3 has a cavity 3' equipped with pins for the fastening of a drive shaft.

A number of balls 16 corresponding to the number of grooves 11, or 14, are mounted in such a manner that each ball 16 is partially contained in a groove 11 and partially in a corresponding groove 14, whereby the ball 16 projects inward past the lower end 14' of the groove 14. The hollow spherical part 13' contains a generally disk-shaped guiding device 17 which has a groove 17' along its circumference and has the shape of a strip of spring steel wound into a tension spring, and which has been mounted in such manner that the parts of the balls 16 projecting past the lower ends 14' of the grooves 14 are contained in the groove 17', whereby this spring exercises a pressure on the balls 16 directed radially outward, and whereby, at the same time, the device 17 keeps the balls 16 together in such manner that the centers of these balls are kept in one plane 28 which is perpendicular to the plane of the cardioids 2 and 4.

Figure 3A:
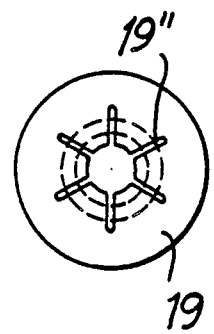
Figure 4:
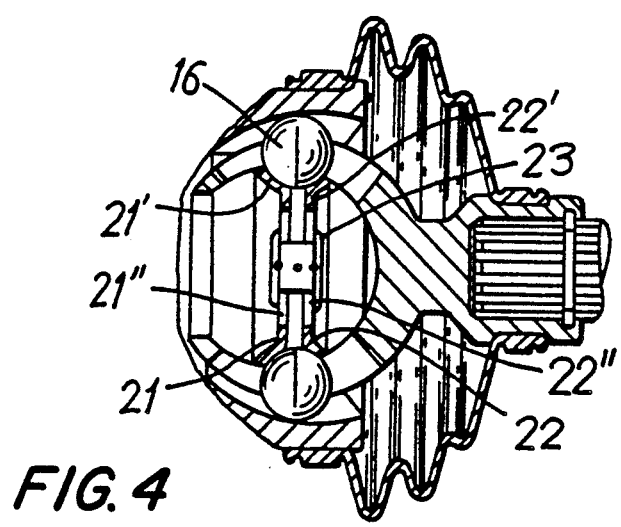
Figure 4A:
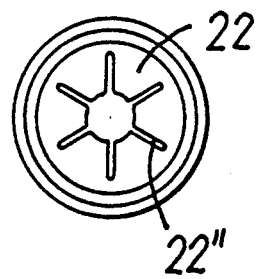

If, as shown in FIG. 2, the inside part 3 is swiveled over an angle alpha with regard to the outside part, the plane 28 will be swiveled over an angle ½ alpha with a result that the plane 28 will remain the bisectional plane of the angle 180°—alpha, which is a requirement for the homokinetic action of the coupling. The shoulder 3" formed at the inside part 3 becomes a stop in conjunction with the front 1' of the housing 1 to limit the swivel angle in such manner that the balls 16 remain in the housing 1. FIG. 3 shows another form of execution of the guiding device which in this case consists of two metal plates 18 and 19 held together by a rivet. The circumferential edges of these plates are bent inward as shown at 18' and 19' so that, together, the bent sections 18' and 19' form a groove for containing the balls 16. A number of slots 18" and 19" (see also FIG. 3a) have been formed in the plates to achieve a spring-like action. In the form of execution shown in FIG. 4, the guiding device includes two metal plates 21, 22, kept together by a rivet 23, whereby the circumferential edges of these plates have been bent outward as shown at 21' and 22', to form a groove. Here, too, slots 21" and 22" (see also FIG. 4a) have been formed in the plates 21, 22.

Figure 5:
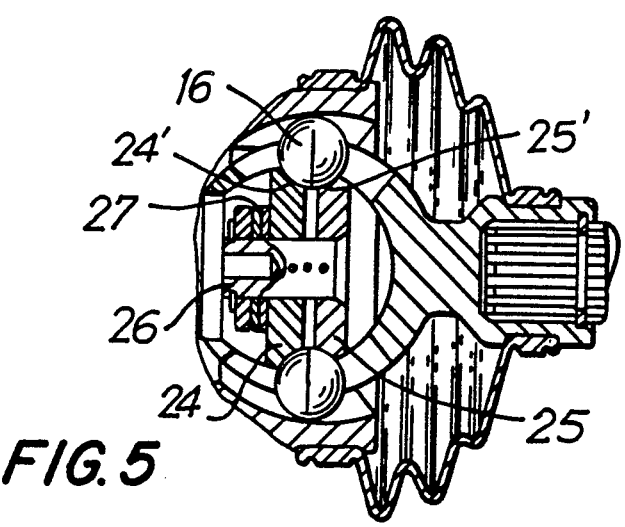

FIG. 5 shows a form of execution of the guiding device consisting of two plates 24, 25 which can slide around the shaft end 26 and are driven toward each other by means of the dish spring 27. The circumferential planes of the plates 24, 25 include recesses 24', 25' which, together, form a groove for containing the balls 16.

We claim:

1. Homokinetic coupling for coupling two components, in particular a rotating drive shaft having a cardioid and a rotatable means to be rotated having a cardioid, in such a manner that said components can be swiveled from a position in which their cardioids are located in each other's extension to a position in which the cardioids are at an angle to one another, including an outside coupling part having the shape of a housing which is connected to one of the two components so that the cardioid of the housing coincides with the cardioid of the rotatable means, and which on one side has a cavity open to the outside and bounded by part of a spherical portion having a wall with a spherical surface, whereby the center of the spherical portion coincides with the point at which the cardioids intersect, and an inside coupling part including a generally spherical end portion located concentrically inside the cavity, which spherical end portion is connected to said two components so that their cardioids coincide, whereby in the wall of the cavity of the outside coupling part a number of grooves are disposed in the direction of the cardioid of the housing the bottoms of which each follow the course of the arc of a circle, whereby the common center of the arcs is located on the extension of the cardioid of the housing at a distance from the center of the spherical surface of the spherical portion, and disposed inside the spherical end portion of the inside coupling part are an equal number of grooves cut in the direction of the cardioid of said inside coupling part, the lower boundaries of which follow the course of arcs of circles whose common center is located on the extension of the cardioid of the inside coupling part at a distance from the center of the spherical surface of the spherical portion, and wherein an equal number of torque-transferring elements are disposed, in particular balls, which are each disposed partially in a groove in a wall of the spherical portion and disposed partially in a corresponding groove in the spherical end portion, whereby said torque-transferring elements interact with a guiding means so that the centers of the torque elements are disposed in a plane which is perpendicular to the plane of the cardioids, characterized in that the lower ends of the grooves in the spherical end portion are open so that the torque-transferring elements disposed therein project inward, and the guiding means comprises a helical coil tension spring disposed concentrically inside the cavity and mounted inside the spherical end portion shaped to define an annular groove along its circumference for containing the inwardly projecting portions of the torque-transferring elements, the tension spring providing a spring force directed radially outward on said torque elements.

* * * * *